(12) United States Patent
Pearson et al.

(10) Patent No.: US 7,140,593 B2
(45) Date of Patent: Nov. 28, 2006

(54) BI-DIRECTIONAL AIR FLOW DAMPER HAVING UNI-DIRECTIONAL SYNCHRONOUS MOTOR

(75) Inventors: James E. Pearson, Downers Grove, IL (US); Robert J. Van der Linde, Aurora, IL (US); Thomas J. Davern, St. Charles, IL (US)

(73) Assignee: Robertshaw Controls Company, Richmond, VA (US)

( * ) Notice: Subject to any disclaimer, the term of this patent is extended or adjusted under 35 U.S.C. 154(b) by 63 days.

(21) Appl. No.: 11/096,244

(22) Filed: Mar. 31, 2005

(65) Prior Publication Data

US 2006/0219971 A1    Oct. 5, 2006

(51) Int. Cl.
*F16K 31/00*    (2006.01)
(52) U.S. Cl. ....................................... 251/251; 251/304
(58) Field of Classification Search ................. 251/251
See application file for complete search history.

(56) References Cited

U.S. PATENT DOCUMENTS 2,098,208 A * 11/1937 Madden et al. ................. 4/213
3,190,609 A *  6/1965 Kintigh ................... 251/129.12
2002/0139950 A1* 10/2002 Lanz et al. ............ 251/129.11

* cited by examiner

*Primary Examiner*—J. Casimer Jacyna
(74) *Attorney, Agent, or Firm*—Reinhart Boerner Van Deuren P.C.

(57) ABSTRACT

A damper assembly that produces bi-directional damper door movement from a single-direction motor is provided. Bi-directional rotation of the damper door is enabled by a cam slot on an end of the damper door that is engaged by a motor-driven drive cam having a drive pin extending into the cam slot. As the single-direction motor collectively rotates the drive cam and the drive pin, the drive pin reciprocates within the cam slot. This causes sealing flanges and the damper from the damper door to alternatively engage under a positive pressure and disengage from one another as the damper door is rotated bi-directionally.

15 Claims, 8 Drawing Sheets

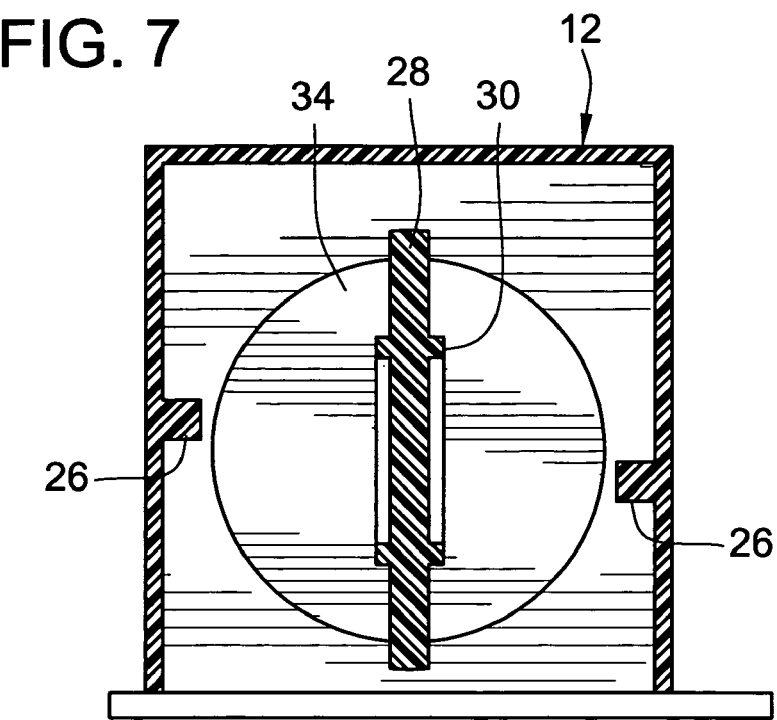
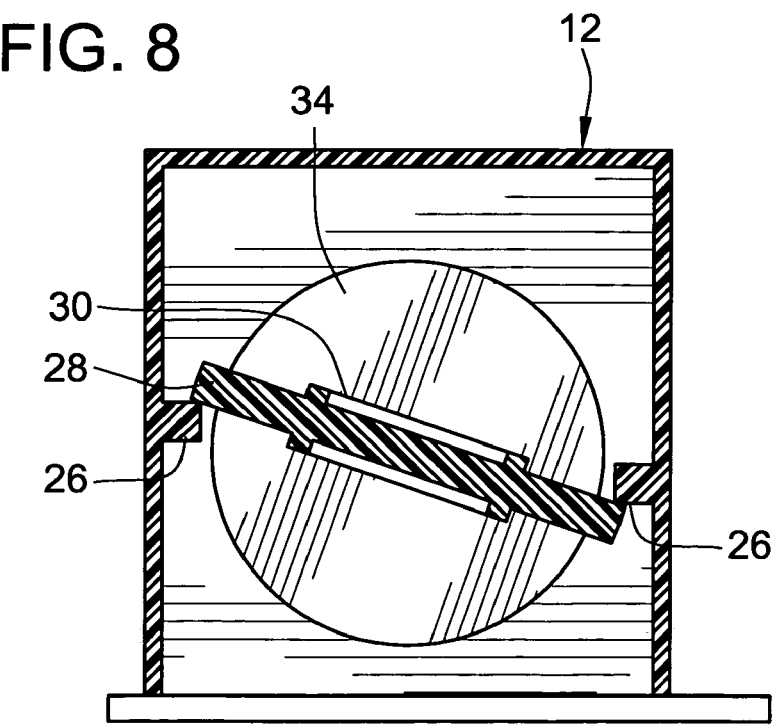

BI-DIRECTIONAL AIR FLOW DAMPER HAVING UNI-DIRECTIONAL SYNCHRONOUS MOTOR

FIELD OF THE INVENTION

The present invention relates generally to rotary dampers that are used to regulate the temperature in compartments of an appliance, and more particularly to bi-directional rotary dampers that have a positive shut off in the closed position for use in such appliances.

BACKGROUND OF THE INVENTION

A typical appliance, such as a refrigerator-freezer, uses a damper assembly to control the movement of air from the freezer to a fresh food compartment to control the temperature of the fresh food compartment. While there exists several types of passive and manually actuated damper assemblies, many damper assemblies use one of the various types of alternating-current, synchronous motors (hereinafter "AC motor"), such as a single-direction AC motor or a bi-directional AC motor, to drive the damper door within the damper assembly between its open and closed positions.

A first type of motor driven damper assembly, known as a "door style" damper assembly, uses a single-direction AC motor to drive a damper door from a closed position to an open position. Because the door style damper assembly only employs a single-direction AC motor, the damper assembly must rely on a spring or other means to draw a damper door back and return the damper assembly to the closed position.

A second type of damper assembly, known as a "rotary" damper assembly, also typically uses a single-direction AC motor to drive or rotate the damper door in the damper assembly between the closed position and the open position. However, the rotary damper assembly works quite differently from the door style damper assembly. The typical rotary damper assembly includes inner and outer hollow cylinders, each having one or more apertures through which fluid may flow. These apertures may be axial or radial, or both. The inner cylinder is nested within the outer cylinder in a manner that permits relative axial rotation of the cylinders about a common longitudinal axis. In axial type rotary dampers assemblies, this inner cylinder receives the fluid flow at an axial inlet. In radial type rotary damper assemblies, the fluid flow enters through a radial inlet in the side wall of both the inner and outer cylinders. The flow of fluid out of the assembly is typically in a radial direction through the side wall apertures, and may also be via an axial aperture. The size of the opening formed by the side wall apertures is proportional to the degree of alignment of the cylinder apertures.

One such rotary damper system is disclosed in U.S. Pat. No. 6,240,735, to Kolson, et al., entitled ROTARY DAMPER ASSEMBLY, and assigned to the assignee of the instant application, the teachings and disclosure of which are hereby incorporated in their entireties by reference thereto. Another is disclosed in U.S. patent application Ser. No. 10/620,104, to Pearson, et al., entitled FLOW-THROUGH ROTARY DAMPER PROVIDING COMPARTMENT SELECTIVITY FOR A MULTI-COMPARTMENT REFRIGERATOR, and assigned to the assignee of the instant application, the teachings and disclosure of which are hereby incorporated in their entireties by reference thereto.

These damper assemblies can first be placed in the closed position by activating the single-direction AC motor until the inner cylinder in the damper is rotated until the two (or more) openings of the inner and outer cylinders are not in alignment. Alternatively, when the damper assembly is to be placed in the open position, the single-direction AC motor is again activated and continues to drive the inner cylinder in the same direction as before until the openings in the two cylinders are aligned. The downfall of such a rotary damper assembly is that, unless there is an extremely tight tolerance between the inner and outer cylinders, air will leak between them even when the damper assembly is rotated to its closed position.

To minimize such leakage, some rotary damper assemblies include a sealing flange or like structure between the two cylinders. Such a structure is meant to provide a barrier to fluid flow when the damper assembly is in the closed position. However, unless there is an extremely tight tolerance between the cylinder and the flange, air will leak even when the damper assembly is rotated to its closed position. This is because there is a lack of positive engagement between the inner cylinder or its "damper" and the sealing flange. As a result, air is still permitted to undesirably flow.

This problem is overcome in a third type of damper assembly, known as a "bi-directional" damper assembly. In such a damper assembly, a motor that can rotate in more than a single-direction, such as a bi-directional AC motor, a direct current motor, or a stepper motor, is used. The bi-directional damper assembly is capable of driving a damper door or a drum in the damper assembly in two different directions, such as forward and reverse. Therefore, when the damper assembly is to be closed, the bi-directional motor drives the damper door forward until the damper door positively engages with a sealing flange. This positive engagement prevents leakage of fluid through the damper assembly in the closed position. Thereafter, when the damper door is to be opened, the damper assembly drives the damper door in the opposite direction. While positive engagement between the damper and the sealing flange is desirable to prevent the fluid leakage in the closed position discussed above, bi-directional motors used to achieve this result are costly. Therefore, damper assemblies that use these bi-directional motors are extremely expensive. As such, they are typically only used in top of the line appliance models.

There exists, therefore, a need in the art for an inexpensive rotary damper assembly that provides a positive contact force closure of the damper door to prevent or minimize any fluid leakage through the damper door in its closed position.

BRIEF SUMMARY OF THE INVENTION

The invention provides a damper assembly for use in refrigeration systems. The damper assembly comprises a housing having sealing flanges, a rotatable damper door, and a single-direction motor. The rotatable damper door is insertable in the housing and has a damper sealably engagable with the sealing flanges and a cam slot on an end of the rotatable damper door. The single-direction motor has a drive cam with a drive pin. The drive pin is engagable with the cam slot. The single-direction motor collectively rotates the drive cam and the drive pin and the drive pin reciprocates within the cam slot. As such, the sealing flanges and the damper alternatively engage under a positive pressure and disengage from one another.

In one aspect, the invention provides a damper assembly for use in refrigeration systems. The damper assembly comprises a housing having sealing flanges, a rotatable damper door, and a single-direction motor. The rotatable damper door is insertable in the housing, has a damper sealably engagable with the sealing flanges, and a cam slot on an end of the rotatable damper door. The single-direction motor has a drive cam with a drive pin. The drive pin is engagable with the cam slot. The single-direction motor rotates the drive cam causing the drive pin on the drive cam to rectilinearly slide within the cam slot. As such, the damper on the damper door alternatively engages with the sealing flanges and disengages from the sealing flanges.

In a further aspect, the invention provides a method of sealing a damper assembly in an appliance. The damper assembly includes sealing flanges, a damper, and a single-direction motor. The method comprises permitting the single-direction motor to rotate, translating rotation of the single-direction motor to rectilinear motion, and using the rectilinear motion to engage the sealing flanges and the damper under a positive pressure.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings:

FIG. 7 is a front, cross-section view of the rotary damper assembly of FIG. 5 taken along line 7—7;

FIG. 8 is a front, cross-section view of the rotary damper assembly of FIG. 6 taken along line 8—8.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In the following description embodiments of the present invention will be described with reference to the figures and with reference to a particular operating environment in which such embodiments find particular applicability. However, those skilled in the art will recognize that such embodiments and operating environments are provided by way of example, and not by way of limitation. Other embodiments and operating environments are possible within the scope of the invention as defined by the appended claims, and all such alternates with the scope of these claims are hereby reserved.

Figure 1:
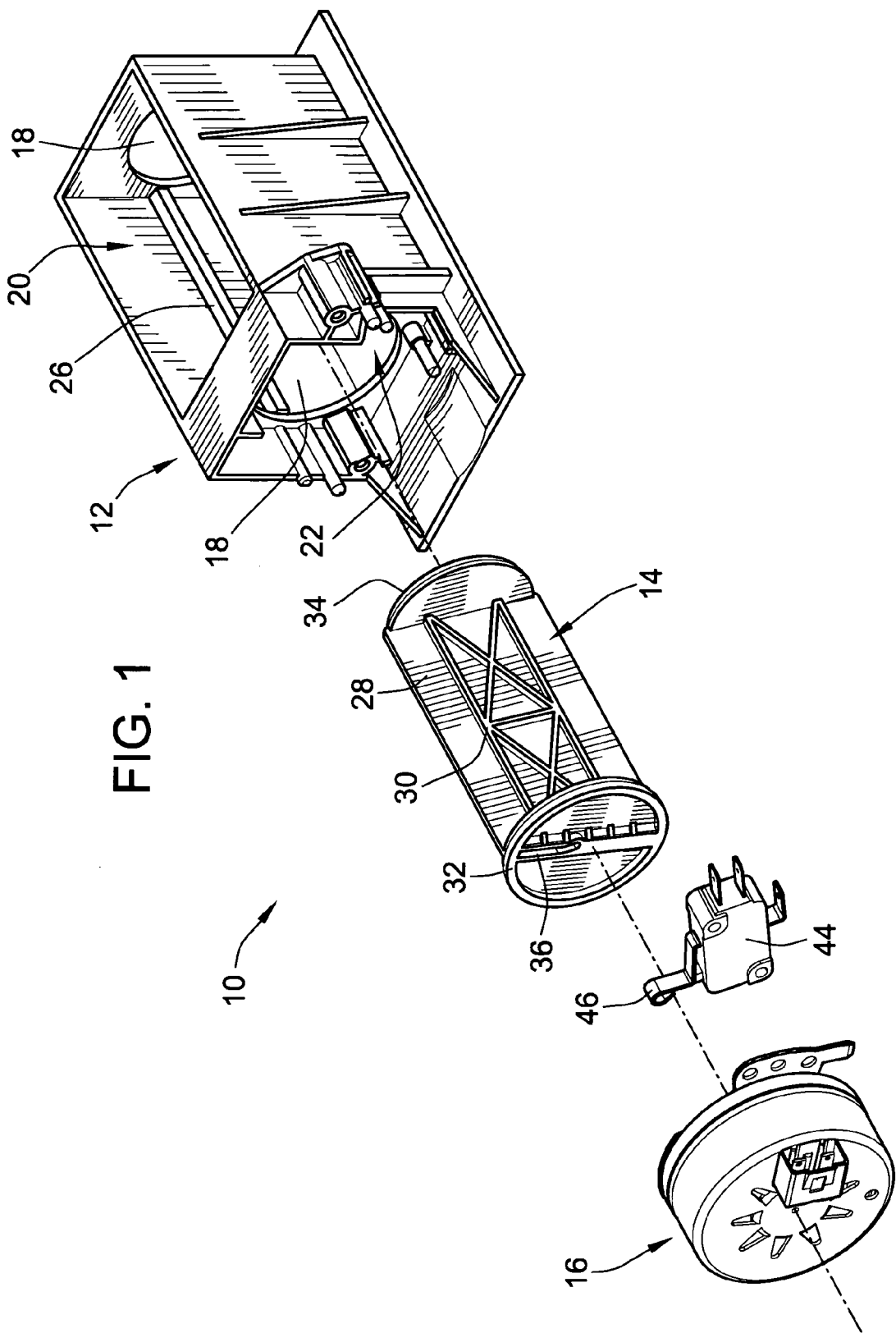
FIG. 1 is an exploded perspective view of an exemplary embodiment of a rotary damper assembly constructed in accordance with the teachings of the present invention.
Figure 2:
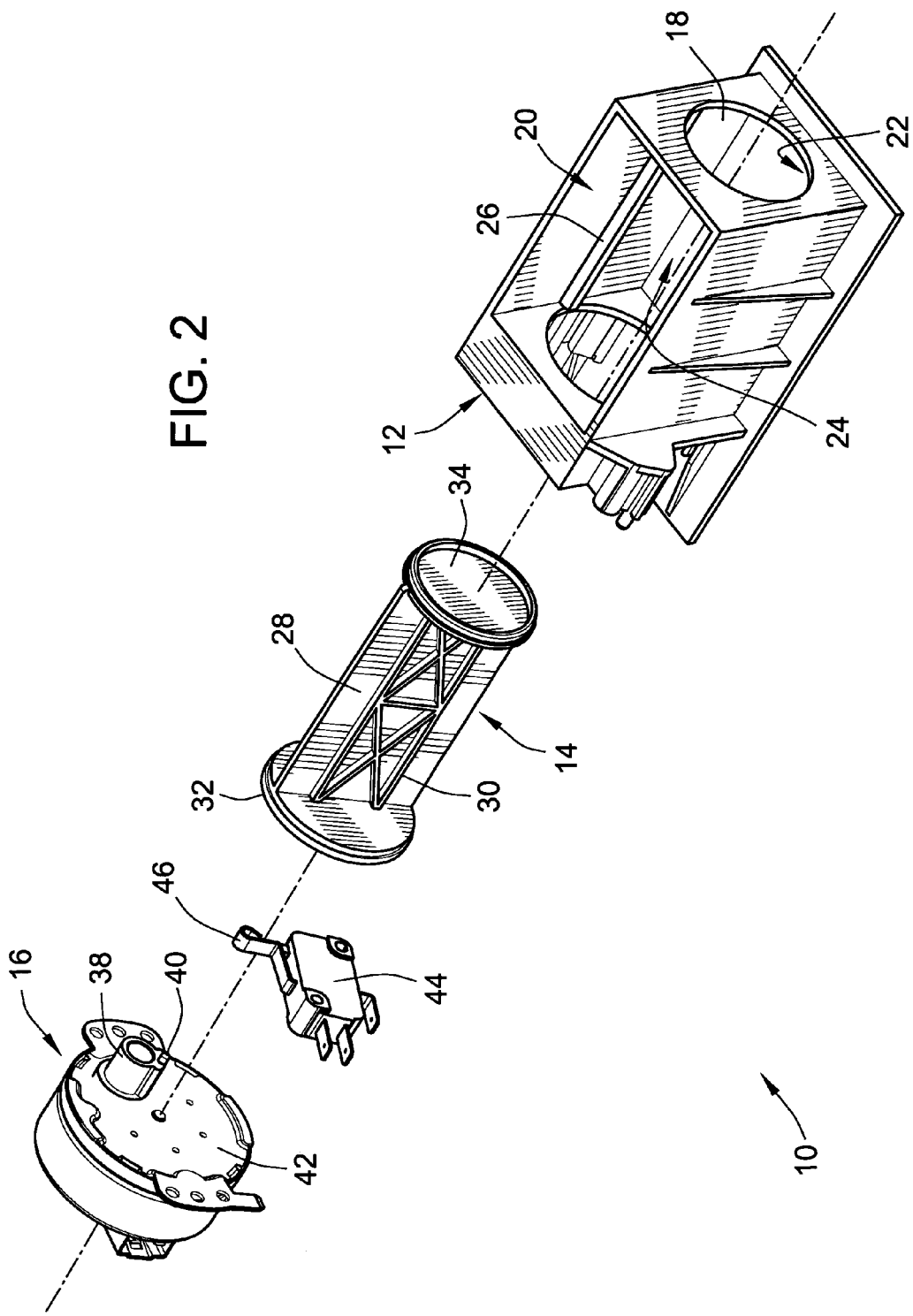
FIG. 2 is an exploded perspective view of the rotary damper assembly of FIG. 1 from an alternate vantage point.

In view of this, reference is now made to FIGS. 1 and 2, which illustrate an embodiment of a damper assembly 10 constructed in accordance with the teachings of the present invention for use in an appliance, e.g., a multi-compartment refrigerator-freezer or the like. The damper assembly 10 includes a stationary housing 12, rotary damper door 14, limit switch 44 and motor assembly 16. Housing 12 includes two circular damper apertures 18, inlet aperture 20, outlet aperture 22, drum cavity 24, and sealing flanges 26. The two circular damper apertures 18 permit the rotary damper door 14 to be slideably inserted into the housing 12, and facilitate the rotation of the rotary damper door within the housing 12 during operation. The inlet and outlet apertures 20, 22 are positioned relative to one another such that fluid flowing into one of the apertures could flow directly out of the other aperture when the damper door 14 is in an open position without experiencing a direction of flow change.

This arrangement of inlet and outlet apertures 20, 22 provides the highest efficiency flow through the rotary damper assembly. However, one skilled in the art will recognize that other installations may necessitate a different orientation and configuration of the two apertures 20, 22 relative to one another, such installations experiencing a slightly less efficient flow of fluid therethrough. The illustrated configuration of the inlet and outlet apertures 20, 22 allow for flush mounting of the damper assembly 10 between two flat wall portions such as may exist between the fresh food compartment and the freezer compartment of a refrigerator.

In the illustrated embodiment, the two sealing flanges 26 are coupled to or formed within either side of the drum cavity 24. To prohibit the flow of fluid through the housing 12 when the damper door 14 is in a closed position contacting the flanges 26, these flanges extend laterally within drum cavity 24 preferably, for the entire length of the drum cavity. However, if the flow path through the housing 12 is more limited, the flanges 26 need only extend as far as the flow path. The location on either side of the housing 12 is also dependent on the configuration of the damper 28. Specifically, the location of the flanges 26 is selected so that each flange 26 contacts a sealing edge of the damper 28 when positioned to inhibit flow of fluid therethrough.

Damper door 14 includes damper 28, braces 30, ends 32, 34 and cam slot 36. Damper 28 in this embodiment is a flat, rectangularly-shaped member disposed between ends 32, 34. Ends 32, 34 are flat, circular-shaped members that are in opposing spaced relation and transverse with damper 28. Grease or other lubricating substance can be applied to a periphery of ends 32, 34 to promote slideable rotation. Braces 30 can be secured to or formed on the damper 28 to lend overall support to the damper door 14. In particular, the braces 30 reduce the potential for twisting over the length of the damper 28 thereby enhancing engagement of sealing flanges 26. However, if damper 28 is sufficiently thick, braces 30 are not required. In a preferred embodiment, damper 28 is sealably engagable with sealing flanges 26 to prevent fluid flow therethrough when the damper door 14 is rotated to the closed position. In highly preferred embodiments, damper 28 is driven toward and/or forcibly biased against sealing flanges 26 to ensure that a seal is formed between the damper and the sealing flanges. Even in embodiments where a "seal" is not formed, the positive closure force greatly enhances the inhibition of fluid flow through the closed damper assembly 10.

Cam slot 36 is a generally rectangularly-shaped cavity that is disposed on end 32, closest in proximity to motor 16 when damper assembly 10 is assembled. Cam slot 36 generally extends radially outward from near the center of end 32 toward the periphery of the end. As will be discussed more fully below, the cam slot 36 also includes a curved end portion at its innermost end. This curved portion of the cam slot 36, in conjunction with the motor 16, the rotating drive cam 38, and pin 40, enables the use of a uni-directional motor to drive the damper 14 bi-directionally to both open and close the damper. In the illustrated embodiment, the cam slot 36 is oriented with the damper 28 such that the position of the cam slot corresponds with the position of the damper.

As indicated above, damper assembly 10 of the present invention provides bi-directional damper rotation utilizing a uni-directional motor 16 that includes a drive cam 38 and drive pin 40 coupled to the motor output. In preferred embodiments, motor 16 comprises a uni-directional alternating-current synchronous motor that is only capable of rotating drive cam 38 in one direction. Motor 16 can include mounting hardware and electrical connectors permitting motor to be, for example, secured to housing 12 and electronically associated with a control system.

Drive cam 38 is driven by the motor output gear (not shown), and extends from a back portion 42 of motor 16 in the illustrated embodiment. When damper assembly 10 is assembled, drive cam 38 is proximate end 32 of damper door 14. As may best be seen from FIG. 5, drive pin 40 is accommodated in a bore or pocket 39 positioned radially outward of the drive cam 38 center. The drive pin 40 extends outwardly from drive cam 38 and is dimensioned such that the drive pin 40 can slideably move within cam slot 36 on end 32 of damper door 14 when the drive pin and the cam slot are engaged. During operation, the drive pin 40 moves rectilinearly within cam slot 36. In other words, drive pin 40 is permitted to oscillate, reciprocate, and/or move bi-directionally within cam slot 36 as the motor 16 drives and/or rotates the drive cam 38. Notably, the drive cam 38, the motor output gear (not shown), and the drive pin 40 can, if desired, be combined into one or more solid parts.

Returning to the embodiment illustrated in FIGS. 1 and 2, damper assembly 10 further includes a switch 44, such as a microswitch, that has a switch lever 46 and an electrical connector. Switch 44 is activated and deactivated by switch lever 46, which rides on the outer surface of drive cam 38. As the motor 16 rotates the drive cam 38, the pocket 39 (FIG. 5) comes into contact with the lever 46 to activate the switch 44. This switch 44 is employed in the illustrated embodiment to relay signals indicating the position of the damper such as, for example, "open" and "closed" to the damper control system to control energization of the motor 16.

Figure 3:
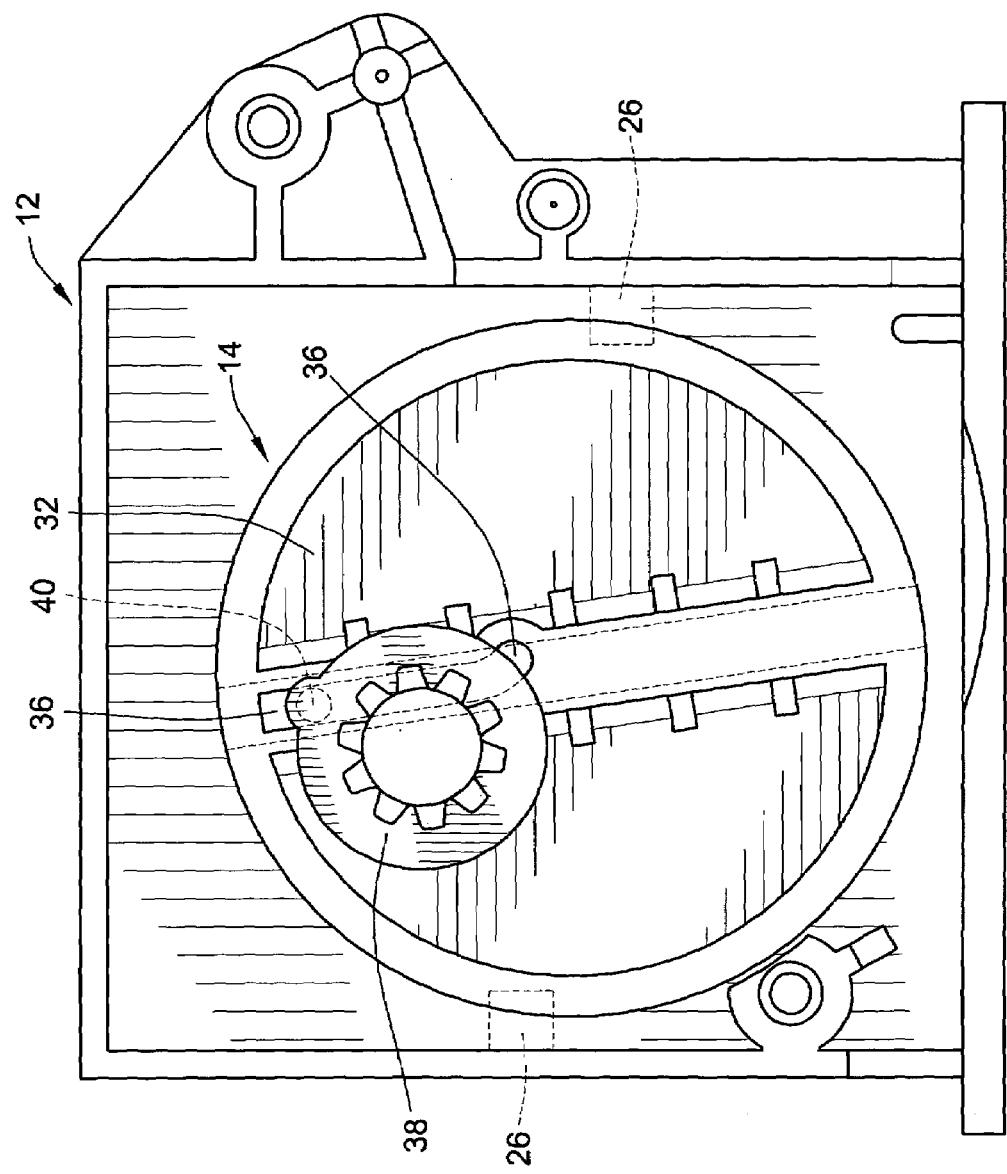
FIG. 3 is a side, elevation view of the rotary damper assembly of FIGS. 1 and 2 when assembled (with the motor partially removed) and when the damper assembly in an open position.
Figure 4:
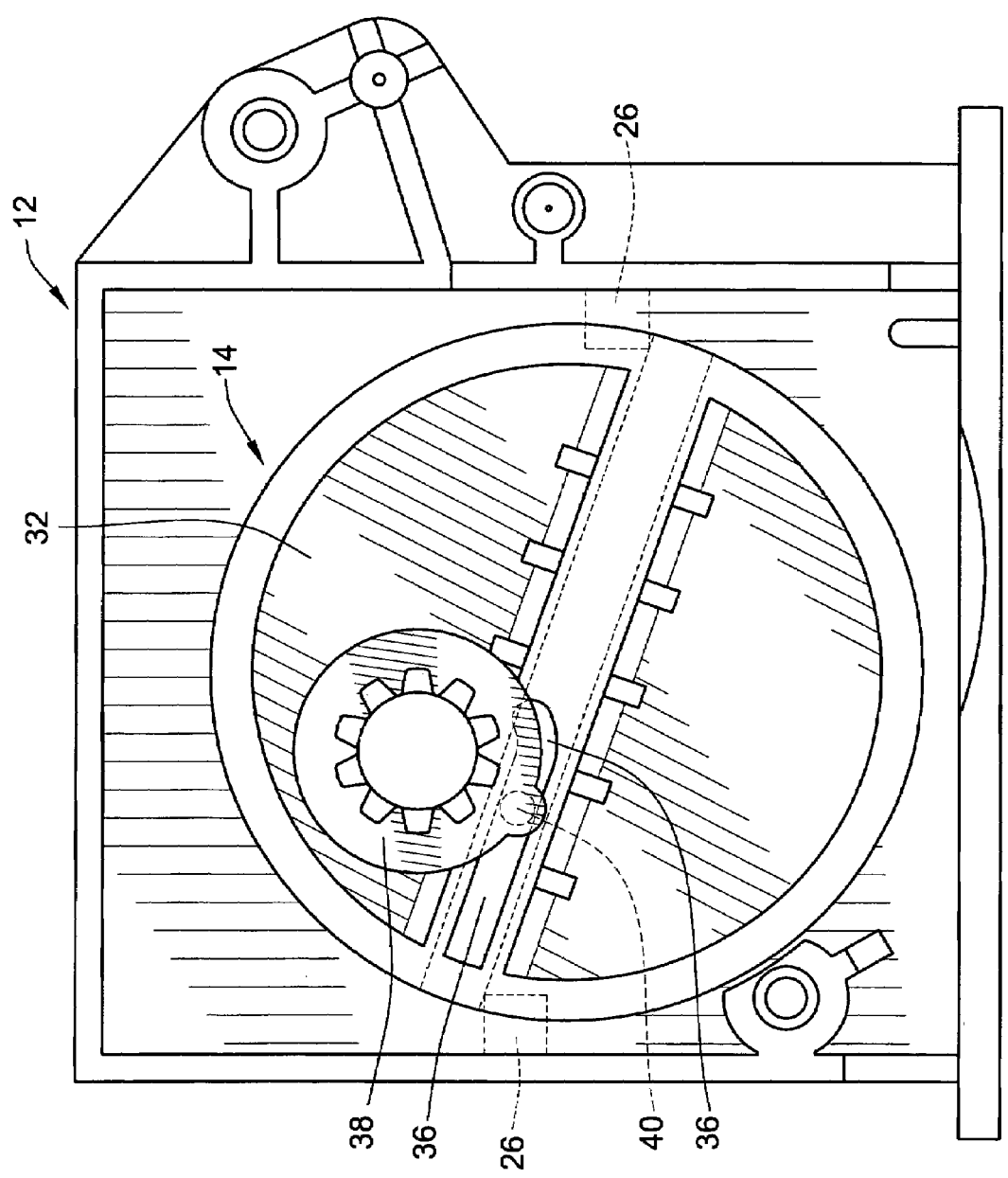
FIG. 4 is a side, elevation view of the rotary damper assembly of FIGS. 1 and 2 when assembled (with the motor partially removed) and when the damper assembly in a closed position.

When rotary damper assembly 10 is assembled, damper door 14 is positioned in housing 12 with ends 32, 34 being accommodated in damper door apertures 18. Therefore, damper door 14 can rotate within housing 12. After damper door 14 has been placed in housing 12, switch 44 and motor 16 are attached to the housing. As this attachment occurs, special care is taken to ensure that drive pin 40 is placed in cam slot 36 as shown in FIGS. 3 and 4. As illustrated in these figures, rotary damper assembly 10 has been assembled but a portion of the motor 16 as well as the switch 44 have been removed to highlight the engagement of drive cam 38 and drive pin 40 (hidden).

Figure 5:
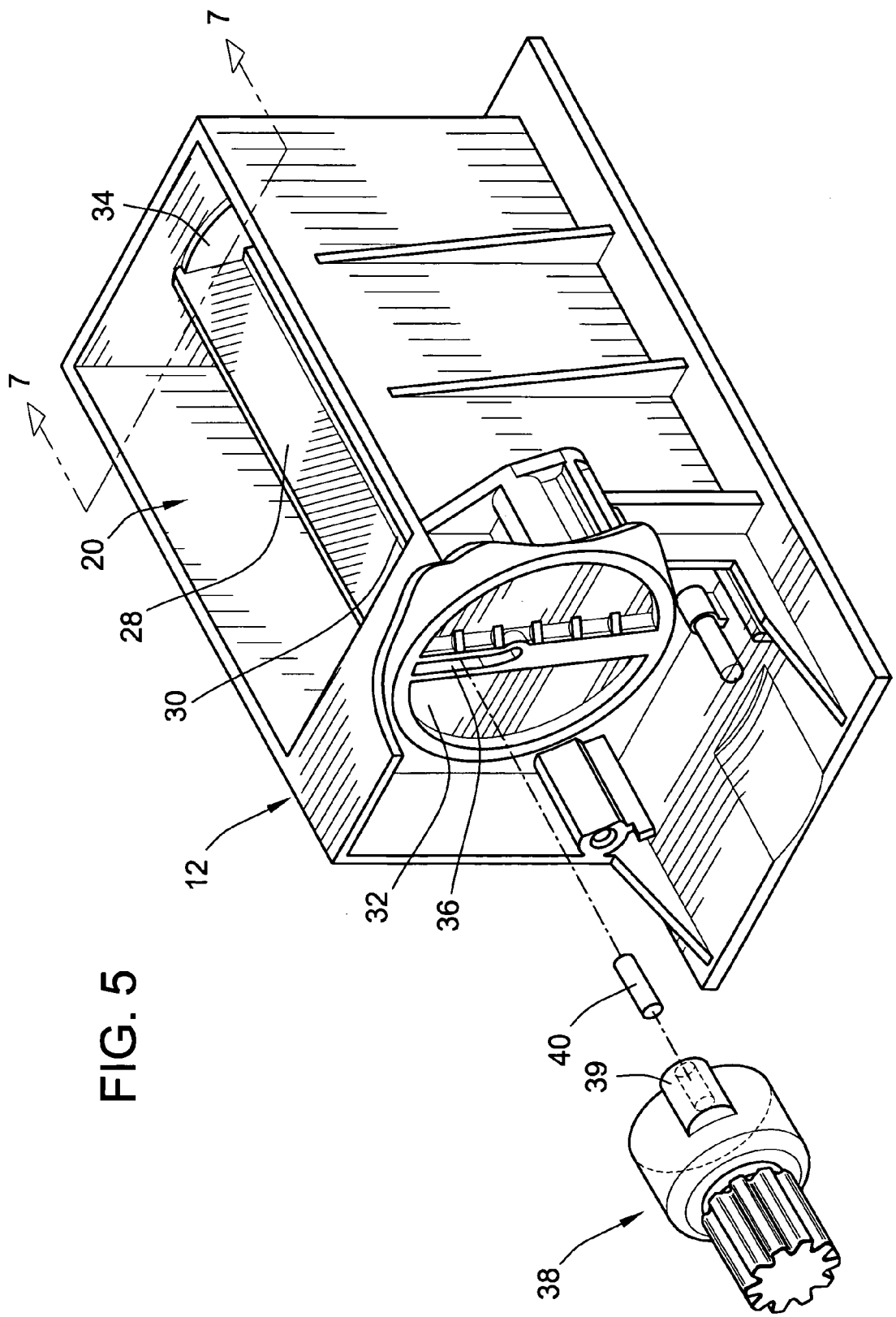
FIG. 5 is a partially-exploded, perspective view of the rotary damper assembly of FIGS. 1 and 2 when assembled (with the motor partially removed) and when the damper assembly in an open position.
Figure 6:
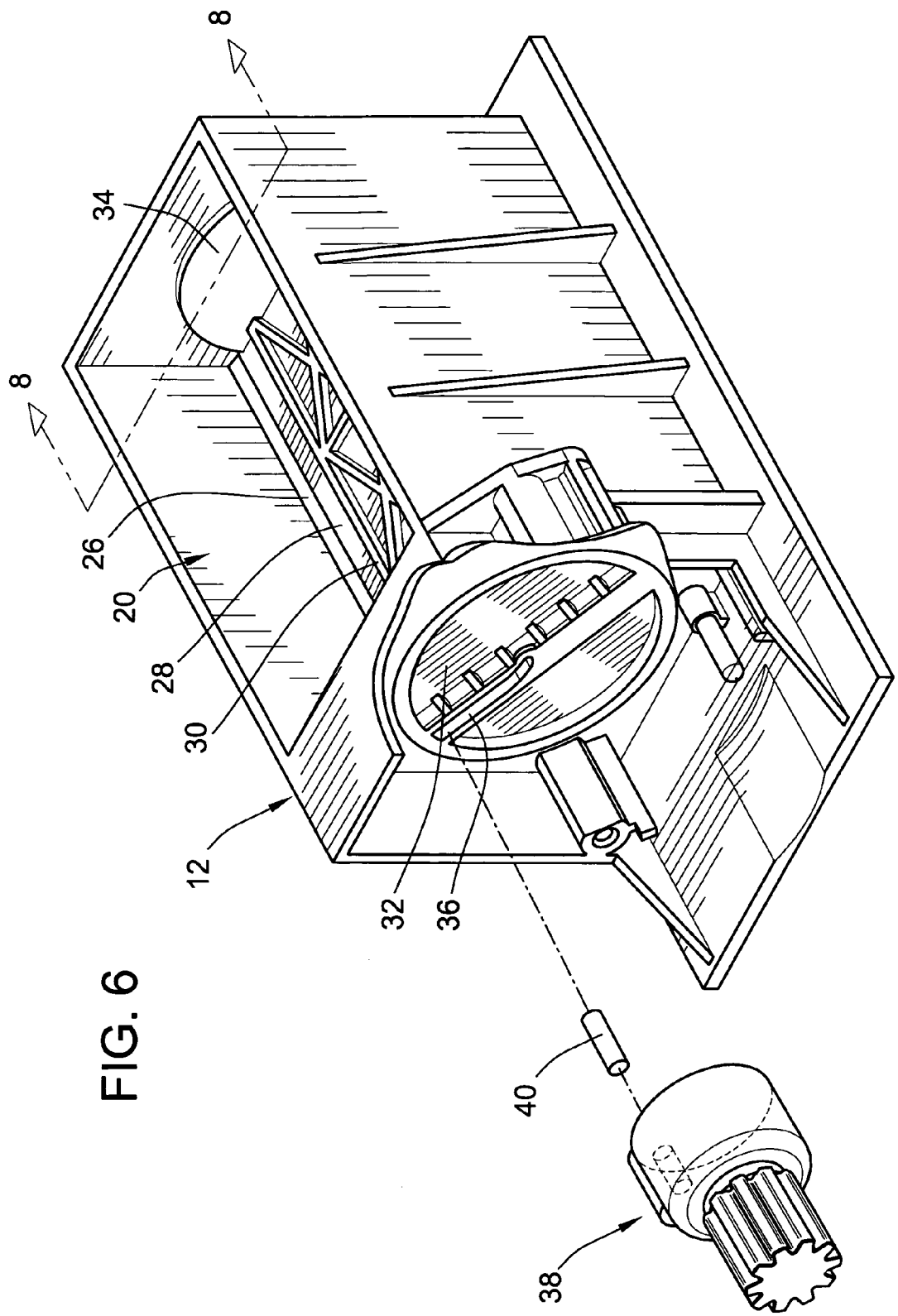
FIG. 6 is a partially-exploded, perspective view of the rotary damper assembly of FIGS. 1 and 2 when assembled (with the motor partially removed) and when the damper assembly in a closed position.

In operation, damper door 14 is rotated by the motor 16 via the drive cam 38 and pin 40 within housing 12 such that the damper 28 can be driven between an open position, as shown in FIGS. 3, 5 and 7, and a closed position as shown in FIGS. 4, 6 and 8. When motor 16 is energized, drive cam 38 and drive pin 40 collectively rotate. The collective rotation of drive cam 38 and drive pin 40 causes the drive pin to move within cam slot 36. Since the cam slot 36 is essentially rectangular, the engagement of the cam slot and drive pin 40 causes the rotational motion supplied by motor 16 to be translated to rectilinear motion. Therefore, while drive pin 40 is rotating on drive cam 38, the drive pin is simultaneously moving rectilinearly in cam slot 36. Stated another way, drive pin 40 will oscillate, reciprocate, move back and forth and/or move bi-directionally within cam slot 36 as the motor 16 is energized.

When damper 28 of the damper assembly 10 is in the open position as shown in FIGS. 3, 5, and 7, drive cam 38 is rotated approximately one hundred eighty degrees to move the damper into the closed position as shown in FIGS. 4, 6 and 8. Notably in this embodiment, damper door 14 and damper 28 rotate only approximately ninety degrees. To move damper assembly 10 back to the open position, drive cam 38 is rotated another one hundred eighty degrees in the same direction as before. Again, damper door 14 and damper 28 rotate only approximately ninety degrees. Advantageously, all of this occurs even though motor 16 only turns in one direction.

In a preferred embodiment, when damper 28 of the damper assembly 10 is in the open position, drive cam 38 is rotated approximately ninety degrees to move the damper door 14 and damper 28 about ninety degrees and into the closed position. To move damper assembly 10 back to the open position, drive cam 38 is rotated another two hundred seventy degrees in the same direction as before to move the damper door and the damper 28 another ninety degrees and into the open position. This embodiment helps provide greater torque during opening such that any ice formed within the damper assembly 10 is broken. Again, all of this occurs even though motor 16 only turns in one direction.

Figure 9:
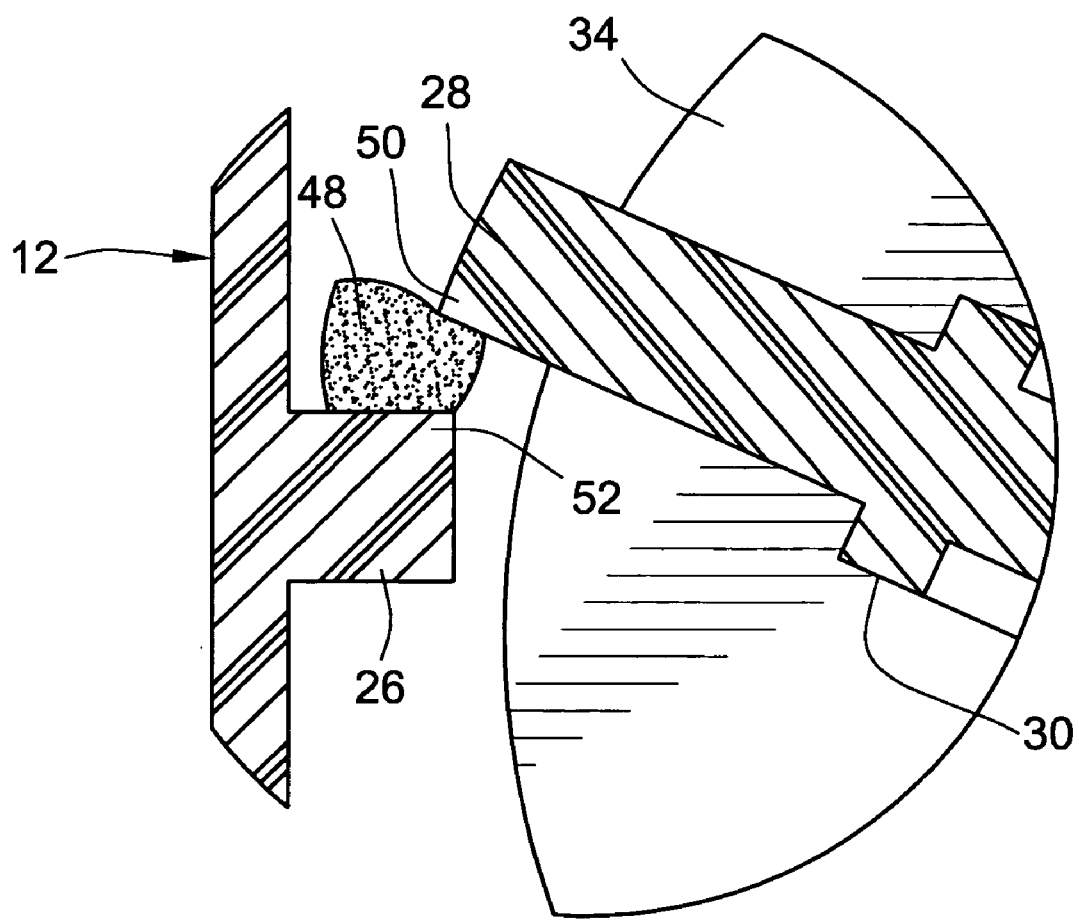
FIG. 9 is a fragmentary view of the cross-section of FIG. 8 highlighting the engagement of the damper and the sealing flange using a sealing substance.

When damper assembly 10 is in the closed position, damper 28 engages sealing flanges 26 under a positive pressure (i.e., damper 28 is driven toward and/or biased against sealing flanges 26). The positive pressure of damper 28 upon sealing flanges 26 greatly enhances the ability of the damper assembly to inhibit air flow therethrough. In preferred embodiments, this positive closure force creates an air tight or virtually air tight seal. To enhance or improve this seal, a seal promoting material 48 (e.g., a portion of foam, rubber, cork, and the like) can be affixed to an engaging portion 50 of the damper 28 as shown in FIG. 9. The seal promoting material 48 can also be placed on an engaging portion 40 of the sealing flanges 26 as well as on both engaging portions 50, 52. Likewise, the seal promoting material 36 can be distributed to both engaging portion 38 of damper 28 and engaging portion 40 of sealing flanges 26.

In summary, since the rotary damper assembly 10 employs a single-direction AC synchronous motor, the overall design of the damper, as well as the control system required to operate the damper, are significantly simplified. As a result, the damper assembly of the present invention provides bi-directional operation with an inexpensive uni-directional motor. Thus, the enhanced functionality provided by this invention may be applied to products and applications that could not have incorporated such dampers due to cost constraints.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A damper assembly for use in refrigeration systems, the damper assembly comprising:
   a housing having sealing flanges;
   a rotatable damper door insertable in the housing, the rotatable damper door having:
      a damper sealably engagable with the sealing flanges; and
      a cam slot on an end of the rotatable damper door; and
   a single-direction motor having a drive cam with a drive pin, the drive pin engagable with the cam slot;
   wherein the single-direction motor collectively rotates the drive cam and the drive pin and the drive pin reciprocates within the cam slot such that the sealing flanges and the damper alternatively engage under a positive pressure and disengage from one another.

2. The damper assembly of claim 1, wherein the damper assembly further comprises a switch for monitoring an open position and a closed position of the damper door.

3. The damper assembly of claim 2, wherein the switch further comprises a switch lever that enables and disables the switch.

4. The damper assembly of claim 1, wherein a portion of the damper and the sealing flanges overlap when the damper is in a closed position.

5. The damper assembly of claim 1, wherein the sealing flanges, the damper, or both the sealing flanges and the damper include a portion of a seal promoting material that is one of the group consisting of foam, rubber, and cork.

6. The damper assembly of claim 1, wherein the damper door rotates no more than ninety degrees when the drive pin rotates ninety degrees.

7. The damper assembly of claim 1, wherein the damper door moves from an open position to a closed position when the drive pin rotates ninety degrees.

8. The damper assembly of claim 7, wherein the damper door returns to the open position from the closed position when the drive pin rotates a further two hundred seventy degrees.

9. The damper assembly of claim 1, wherein the damper assembly is in an open position when the damper and the sealing flanges are disengaged and in a closed position when the damper and the sealing flanges are engaged.

10. A damper assembly for use in refrigeration systems, the damper assembly comprising:
    a housing having sealing flanges;
    a rotatable damper door insertable in the housing, the rotatable damper door having:
       a damper sealably engagable with the sealing flanges; and
       a cam slot on an end of the rotatable damper door; and
    a single-direction motor having a drive cam with a drive pin, the drive pin engagable with the cam slot;
    wherein the single-direction motor rotates the drive cam, causing the drive pin on the drive cam to rectilinearly slide within the cam slot, such that the damper on the damper door alternatively engages with the sealing flanges and disengages from the sealing flanges.

11. The damper assembly of claim 10, wherein the sealing flanges and the damper overlap when the sealing flanges and the damper are engaged.

12. The damper assembly of claim 10, wherein the damper and the sealing flanges overlap under a positive pressure when the sealing flanges and the damper are engaged.

13. The damper assembly of claim 10, wherein the rectilinear motion is one of the group consisting of bi-directional, reciprocal, and oscillating.

14. The damper assembly of claim 10, wherein the sealing flanges, the damper, or both the sealing flanges and the damper include a sealing substance selected from the group of foam, rubber, and cork.

15. The damper assembly of claim 10, wherein the single-direction motor is an alternating-current synchronous motor.

* * * * *